United States Patent
Yagita (10) Patent No.: US 7,669,624 B2
(45) Date of Patent: Mar. 2, 2010

(54) PNEUMATIC TIRE WITH TREAD HAVING CIRCUMFERENTIAL GROOVES

(75) Inventor: Masanori Yagita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 448 days.

(21) Appl. No.: 11/180,614

(22) Filed: Jul. 14, 2005

(65) Prior Publication Data

US 2006/0011280 A1 Jan. 19, 2006

(30) Foreign Application Priority Data

Jul. 16, 2004 (JP) .............................. 2004-210219

(51) Int. Cl.
*B60C 11/04* (2006.01)
*B60C 11/13* (2006.01)

(52) U.S. Cl. .................................. 152/209.24; 152/901

(58) Field of Classification Search ............ 152/209.15, 152/209.18, 209.24, 209.8, 209.9, 209.23, 152/209.26, 901

See application file for complete search history.

(56) References Cited

U.S. PATENT DOCUMENTS

| | | | | |
|---|---|---|---|---|
| 3,768,535 A | * | 10/1973 | Holden ................... | 152/209.24 |
| 4,284,115 A | * | 8/1981 | Ohnishi ................. | 152/209.24 |
| 4,446,901 A | * | 5/1984 | Endo et al. ............. | 152/290.24 |
| 4,462,446 A | * | 7/1984 | Goergen et al. ........ | 152/209.18 |
| 5,450,885 A | * | 9/1995 | Hanya ................... | 152/209.26 |
| 5,679,185 A | * | 10/1997 | Tanaka ................... | 152/209.26 |
| 5,810,953 A | * | 9/1998 | Tanaka et al. ........... | 152/209.26 |
| 6,026,874 A | * | 2/2000 | Shibata et al. .......... | 152/209.18 |
| 6,681,823 B2 | * | 1/2004 | Nakamura ............. | 152/209.23 |
| 2006/0191616 A1 | * | 8/2006 | Canankamp et al. ... | 152/209.24 |

FOREIGN PATENT DOCUMENTS

| | | |
|---|---|---|
| EP | 0 728 599 A | 8/1996 |
| JP | 63-068406 A | 3/1988 |
| JP | 03-042306 A | 2/1991 |
| JP | 03-125607 * | 5/1991 |
| JP | 04-133804 * | 5/1992 |
| JP | 10-272906 A | 1/1999 |

(Continued)

OTHER PUBLICATIONS

Japanese Office Action dated Nov. 1, 2005.

(Continued)

*Primary Examiner*—Steven D Maki
(74) *Attorney, Agent, or Firm*—Greer, Burns & Crain, Ltd.

(57) ABSTRACT

A pneumatic tire includes a tread surface on which a plurality of circumferential groove portions is formed. From among circumferential groove portions, a circumferential groove portion situated closest to a shoulder portion side in a tire width direction has a center of a groove-bottom innermost portion at a portion where a groove width in at least a tire circumferential direction is the narrowest, positioned closer to an equatorial surface in the tire width direction than a center of the groove width. An angle between a virtual extension portion of the tread surface and a groove wall on the equatorial surface side is equal to or less than an angle between the virtual extension portion of the tread surface and a groove wall on the shoulder portion side.

13 Claims, 3 Drawing Sheets

FOREIGN PATENT DOCUMENTS

| | | |
|---|---|---|
| JP | 11-208213 A | 8/1999 |
| JP | 2001-030718 A | 2/2001 |
| JP | 2001-063315 A | 3/2001 |
| JP | 2001-213115 A | 8/2001 |
| JP | 2002-19422 | 1/2002 |
| JP | 2002-019422 * | 1/2002 |
| JP | 2003-312212 * | 11/2003 |

OTHER PUBLICATIONS

European Search Report dated Nov. 9, 2005.

* cited by examiner

|  | CONVENTIONAL EXAMPLE | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| ANGLE α OF SECOND-RIB-SIDE GROOVE WALL | 80 | 70 | 75 | 40 | 80 |
| ANGLE β OF SHOULDER-RIB-SIDE GROOVE WALL | 80 | 85 | 70 | 80 | 80 |
| α/β | 1.00 | 0.82 | 1.07 | 0.50 | 1.00 |
| DISPLACEMENT [%] OF CENTER OF GROOVE-BOTTOM INNERMOST PORTION WITH RESPECT TO CENTER OF GROOVE WIDTH (+ : CLOSER TO SECOND RIB) | 0 | -5 | 5 | 10 | 10 |
| GROOVE CRACK RESISTANCE | 100 | 95 | 95 | 120 | 95 |
| RIB TEAR RESISTANCE | 100 | 105 | 110 | 100 | 100 |
| WET PERFORMANCE | 100 | 100 | 100 | 90 | 100 |

FIG.5

|  | INVENTION EXAMPLE 1 | INVENTION EXAMPLE 2 | INVENTION EXAMPLE 3 | INVENTION EXAMPLE 4 |
|---|---|---|---|---|
| ANGLE α OF SECOND-RIB-SIDE GROOVE WALL | 75 | 75 | 75 | 50 |
| ANGLE β OF SHOULDER-RIB-SIDE GROOVE WALL | 85 | 80 | 80 | 80 |
| α/β | 0.88 | 0.94 | 0.94 | 0.63 |
| DISPLACEMENT [%] OF CENTER OF GROOVE-BOTTOM INNERMOST PORTION WITH RESPECT TO CENTER OF GROOVE WIDTH (+ : CLOSER TO SECOND RIB) | 5 | 10 | 5 | 10 |
| GROOVE CRACK RESISTANCE | 110 | 120 | 110 | 120 |
| RIB TEAR RESISTANCE | 110 | 100 | 100 | 100 |
| WET PERFORMANCE | 100 | 100 | 100 | 95 |

PNEUMATIC TIRE WITH TREAD HAVING CIRCUMFERENTIAL GROOVES

CROSS-REFERENCE TO RELATED APPLICATIONS

The present document incorporates by reference the entire contents of Japanese priority document, 2004-210219 filed in Japan on Jul. 16, 2004.

BACKGROUND OF THE INVENTION

1. Field of the Invention

The present invention relates to a pneumatic tire, and, more particularly, to a pneumatic tire capable of suppressing a crack at the bottom of a groove.

2. Description of the Related Art

During driving of a vehicle with conventional pneumatic tires, a rib is deformed caused by a load that is applied from a road to a tread surface of the pneumatic tire, and grooves formed on the tread surface are also deformed caused by the rib deformed. Particularly, the load is easily applied to a shoulder rib that is formed at an edge of a shoulder portion side during the driving of the vehicle, and a groove near the shoulder rib is largely deformed. Therefore, a crack may occur in the bottom of the groove in this portion. In some of the conventional pneumatic tires, the strength of the groove situated at the edge of the shoulder portion side and of the periphery of the groove is improved.

This type of pneumatic tire is disclosed, for example, in Japanese Patent Application Laid-Open No. 2001-63315. In this pneumatic tire, at least one circumferential belt layer is arranged at an inner side of the groove situated at the edge of the shoulder portion, side in a tire radial direction, and a projection is provided in the bottom of the groove. This configuration causes the groove to be reinforced and occurrence of a crack in the bottom of the groove to be reduced. Another example of the same type of pneumatic tire is disclosed in Japanese Patent Application Laid-Open No. 2001-213115. In this pneumatic tire, a circumferential belt layer and an auxiliary belt layer made of organic fabric code are provided at an inner side of the groove of the shoulder portion side in the tire radial direction. With this configuration, the periphery of the groove at the edge of the shoulder portion side is reinforced, which allows reduction of a crack in the bottom of the groove.

If a projection is provided in the groove, however, the capacity of a space in the groove is reduced, which may cause drainage to be reduced when a vehicle is driven in the rain. Furthermore, when a predetermined groove width is ensured to increase the drainage and the inner side in the tire radial direction of the groove is reinforced by the circumferential belt layer and the auxiliary belt layer, a pebble or so is caught in the groove and a part of the groove may be chipped. In such cases, it is difficult to ensure compatibility between suppression of the crack in the bottom of the groove and some other performances.

SUMMARY OF THE INVENTION

It is an object of the present invention to at least solve the problems in the conventional technology.

A pneumatic tire according to one aspect of the present invention includes a tread surface on which a plurality of circumferential groove portions is formed. From among the circumferential groove portions, a circumferential groove portion situated closest to a shoulder portion side in a tire width direction has a center of a groove-bottom innermost portion at a portion where a groove width in at least a tire circumferential direction is the narrowest, positioned closer to an equatorial surface in the tire width direction than a center of the groove width. An angle between a virtual extension portion of the tread surface and a groove wall on the equatorial surface side is equal to or less than an angle between the virtual extension portion of the tread surface and a groove wall on the shoulder portion side.

A pneumatic tire according to another aspect of the present invention includes a tread surface on which a plurality of circumferential groove portions is formed. From among the circumferential groove portions, a circumferential groove portion situated closest to a shoulder portion side in a tire width direction has a center of a groove-bottom innermost portion at a portion where at least a groove width on the shoulder portion side is closest to an equatorial surface in the tire width direction, positioned closer to the equatorial surface than a center of the groove width. An angle between a virtual extension portion of the tread surface and a groove wall on the equatorial surface side is equal to or less than an angle between the virtual extension portion of the tread surface and a groove wall on the shoulder portion side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

According to the study carried out by inventers of this application, the inventers analyzed two types of pneumatic tires having a rib pattern that includes five groove portions in a circumferential direction to solve problems. More specifically, one of the two types is such that a groove width is narrow and a groove bottom is less rounded, and the other type is such that the groove width is wide and the groove bottom is largely rounded. How to analyze them is as follows. A vehicle with each type of the two types of pneumatic tires was driven 150,000 kilometers along a course of a 100% paved road, and analysis was carried out on a shape of a groove crack that is a crack at a groove bottom and a shape of a rib tear that is a chip of a rib due to a pebble caught in the groove. It is found based on the analysis that the groove crack occurs in a groove portion in a circumferential direction (hereinafter, "circumferential groove portion") adjacent to a shoulder rib and easily occurs in the groove bottom on the shoulder rib side of the circumferential groove portion, and that the groove crack less occurs when the groove bottom is more largely rounded, and that the groove crack less occurs because distortion of the rib due to its compression is small when the groove width is narrower or the rib width is wider. It is also found that the rib tear less occurs when the groove width is narrower. Based on these facts, it is found that occurrence of the groove crack can be suppressed by making high the rigidity of a second rib that is formed adjacent to the shoulder rib through the circumferential groove portion in a direction of the equatorial surface, making low the rigidity of the shoulder rib, and making the groove bottom on the shoulder rib side rounded largely. The inventors have found out the shape of the groove crack as a result of keen study to lead to achievement of the present invention.

Exemplary embodiments of a pneumatic tire according to the present invention are explained in detail below with reference to the accompanying drawings. It is noted that the present invention is not limited by the embodiments. Components according to the embodiments include those which can easily be replaced by persons skilled in the art or which are substantially the same as the components. There are some types of tread patterns formed on the tread surface of the pneumatic tire, and a pattern forming the circumferential groove mainly includes a rib pattern, a rib-lug pattern, and a block pattern. The present invention is applicable to all of the tread patterns, and therefore, as an example of the pneumatic tire, a pneumatic tire with the rib pattern formed thereon is explained below.

Figure 1:
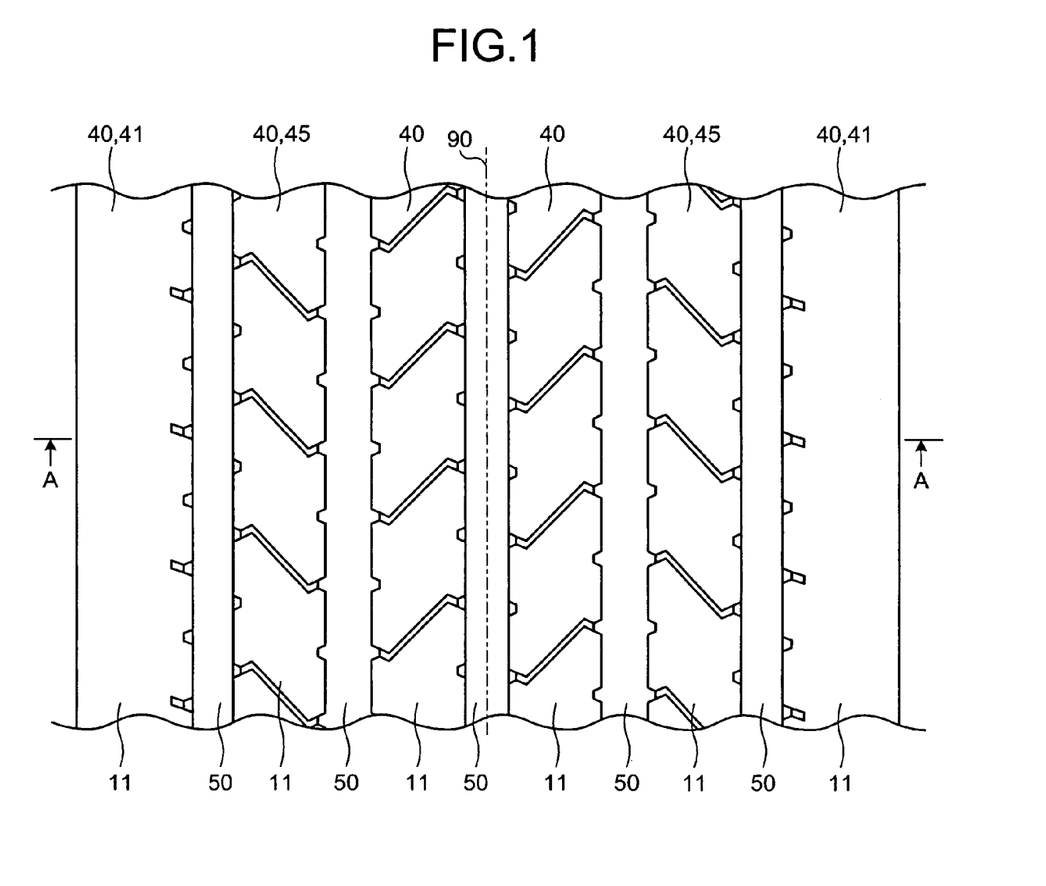
FIG. 1 is a diagram of a tread surface of a pneumatic tire according to the present invention.
Figure 2:
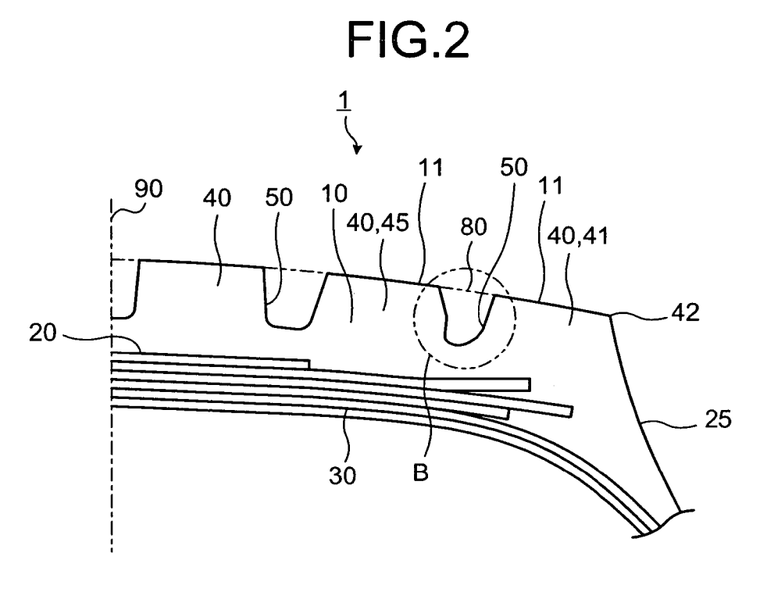
FIG. 2 is a cross-section taken along the line A-A of FIG. 1.

In the following explanation, a tire width direction indicates a direction parallel to the rotating shaft of a pneumatic tire, an inner side in the tire width direction indicates a direction toward an equatorial surface in the tire width direction, and an outer side in the tire width direction indicates an opposite direction to a direction toward the equatorial surface in the tire width direction. Further, a tire radial direction indicates a direction orthogonal to the rotating shaft. A tire circumferential direction indicates a circumferential direction in which the rotating shaft is a central axis. FIG. 1 is a diagram of a tread surface of the pneumatic tire according to the present invention. FIG. 2 is a cross-section taken along the line A-A of FIG. 1. A pneumatic tire 1 has a tread portion 10 formed on the outermost side in the tire radial direction when viewed as its cross-section in a meridian direction, and groove portions that form a tread pattern are formed on a tread surface 11 that is a surface of the tread portion 10. Five lines of the groove portions are formed on the tread surface 11 as circumferential groove portions 50 formed in the tire circumferential direction. A belt layer 20 is provided at the inner side in the tire radial direction of the tread portion 10. A sidewall portion 25 is further provided from both ends of the tire width direction of the tread portion 10 toward the inner side in the tire radial direction, and a carcass 30 is provided at the inner side in the tire width direction of the sidewall portion 25 and the inner side in the tire radial direction of the belt layer 20.

Formed on the tread surface 11 is a tread pattern with the circumferential groove portions 50, and a portion partitioned by the circumferential groove portions 50 is formed as a rib 40. Because the rib 40 is partitioned by the circumferential groove portions 50, the rib 40 is also formed in plurality. Of the ribs 40, a rib 40 formed at the edge in the tire width direction is a shoulder rib 41. The edge of the sidewall portion 25 side of the shoulder rib 41 in the tire width direction of the tread surface 11, namely the edge of the tread surface 11 in the tire width direction is formed as a shoulder portion 42. Of the ribs 40, a rib 40 adjacent to the side of an equatorial surface 90 of the shoulder rib 41 in the tire width direction through the circumferential groove portion 50 is formed as a second rib 45. In other words, of the circumferential groove portions 50, a circumferential groove portion 50 situated closest to the side of the shoulder portion 42 in the tire width direction is formed between the shoulder rib 41 and the second rib 45.

Figure 3:
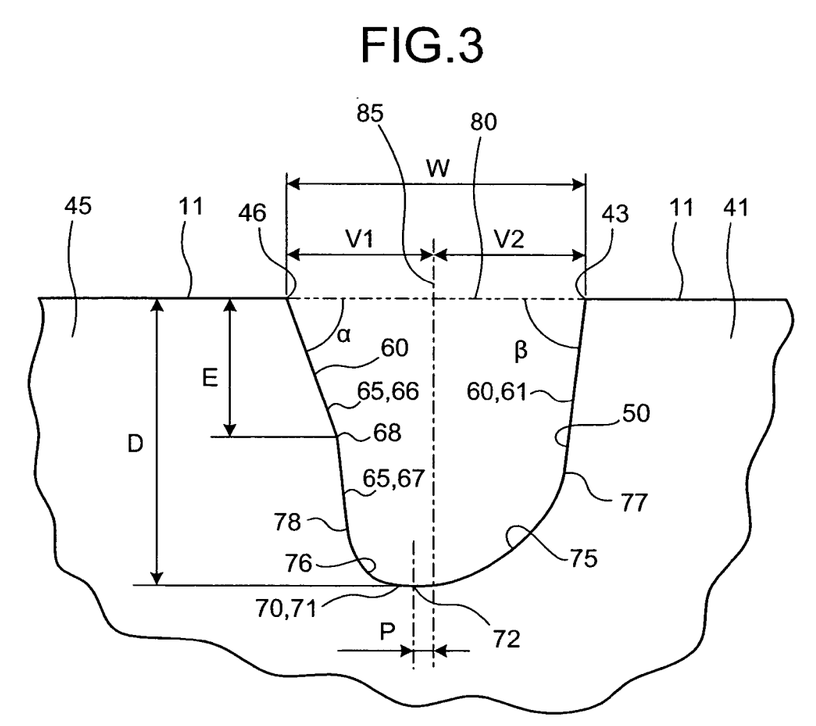
FIG. 3 is a detailed diagram of the part B of FIG. 1.

FIG. 3 is a detailed diagram of the part B of FIG. 1. Of the circumferential groove portions 50, the circumferential groove portion 50 formed between the shoulder rib 41 and the second rib 45 has two groove walls 60 facing each other each of which is formed at a different inclination angle. More specifically, one of the two groove walls 60 has a shoulder-rib-side groove wall 61 that is adjacent to the shoulder rib 41 and is formed as the groove wall 60 on the side of the shoulder portion 42, and the other one has a second-rib-side groove wall 65 that is adjacent to the second rib 45 and is formed as the groove wall 60 on the side of the equatorial surface 90. Both of the groove walls 60 have different angles with respect to a virtual extension portion 80 that is a part of the tread surface 11 virtually formed over an opening portion of the circumferential groove portion 50. A relation between the two groove walls 60 with respect to the virtual extension portion 80 is such that an angle α between the virtual extension portion 80 and the second-rib-side groove wall 65 is equal to or less than an angle β between the virtual extension portion 80 and the shoulder-rib-side groove wall 61.

The second-rib-side groove wall 65 is formed by two planes, and the two planes are formed in such a manner that angles with respect to the virtual extension portion 80 are different from each other in the depth direction of the groove. Of the two planes of the second-rib-side groove wall 65, the plane that forms the angle α with the virtual extension portion 80 is formed as a first second-rib-side groove wall 66. The other one of the two planes is formed as a second second-rib-side groove wall 67 that is situated more internally in the tire radial direction than the first second-rib-side groove wall 66.

The second second-rib-side groove wall 67 is formed in such a manner that the angle between the second second-rib-side groove wall 67 and the virtual extension portion 80 is greater than the angle α between the first second-rib-side groove wall 66 and the virtual extension portion 80. Therefore, a joint part between an end of the first second-rib-side groove wall 66 on its groove bottom 70 side and an end of the second second-rib-side groove wall 67 on its tread surface 11 side is formed as a corner portion 68 that is projected toward the shoulder-rib-side groove wall 61. The corner portion 68 is formed in such a manner that a distance E from the tread surface 11 in the depth direction of the groove is formed in a position that is one-half of a groove depth D of the circumferential groove portion 50.

The angle α between the virtual extension portion 80 and the second-rib-side groove wall 65 is formed by the first second-rib-side groove wall 66 that is a part of the second-rib-side groove wall 65 and the virtual extension portion 80. More specifically, the angle α is formed in a range of $45° \leq α \leq 75°$, the angle β is formed in a range of $75° \leq β \leq 110°$, and a relation between the angle α and the angle β is $0.5 \leq (α/β) \leq 0.95$. The second second-rib-side groove wall 67 is formed so that the angle between the second second-rib-side groove wall 67 and the virtual extension portion 80 becomes 90° or less.

The shoulder-rib-side groove wall 61 and the second-rib-side groove wall 65 are joined to the groove bottom 70. A groove-bottom innermost portion 71 of the groove bottom 70, such that the groove depth of the circumferential groove portion 50 is the deepest, is formed closer to the equatorial surface 90. By forming it in the above manner, a groove-bottom innermost portion center 72 that is the center of the groove-bottom innermost portion 71 in the groove width direction of the circumferential groove portion 50 is situated closer to the equatorial surface 90 than the central line 85 that is the center of the groove width. The central line 85 is a line indicating the center of the opening portion in the groove width direction of the circumferential groove portion 50, and is also a line indicating the center of a groove width W that is a distance between an opening edge 46 on the second rib 45 side and an opening edge 43 on the shoulder rib 41 side in the tire width direction. Therefore, the central line 85 is situated in a portion in which both of a distance V1 and a distance V2 become one-half of the groove width W, the distance V1 being from the opening edge 46 on the second rib 45 side to the central line 85, and the distance V2 being from the opening edge 43 on the shoulder rib 41 side to the central line 85.

The groove-bottom innermost portion center 72 is situated closer to the equatorial surface 90 than the central line 85 situated in the above manner, and a displacement P of the groove-bottom innermost portion center 72 from the central line 85 in the tire width direction is a distance of 5% or more of the groove width W. The groove-bottom innermost portion center 72 is situated in a portion that is closer to the equatorial surface 90 from the central line 85 or in a portion that is closer to the second rib 45 side and is separated from the central line 85 by the displacement P. The groove-bottom innermost portion 71 is formed in such a manner that the groove-bottom innermost portion center 72 is set as a center in the tire width direction. It is preferable that the displacement P is closer to the equatorial surface 90 or to the second rib 45 from the central line 85, and that the displacement P ranges from 5% to 30% of the groove width W.

The groove-bottom innermost portion 71 formed in the above manner and the shoulder-rib-side groove wall 61 are joined to each other by a curved surface that is projected in the direction of the shoulder rib 41 adjacent to the circumferential groove portion 50 or toward the inner side in the tire radial direction, namely, by a shoulder-rib-side curved surface portion 75 that is a curved surface on the shoulder portion side. In other words, the shoulder-rib-side curved surface portion 75 is formed by a curved surface that is recessed toward the second-rib-side groove wall 65. Likewise, the groove-bottom innermost portion 71 and the second-rib-side groove wall 65 are joined to each other by a curved surface that is projected in the direction of the second rib 45 adjacent to the circumferential groove portion 50 or toward the inner side in the tire radial direction, or by a second-rib-side curved surface portion 76 that is a curved surface in the equatorial surface side. In other words, the second-rib-side curved surface portion 76 is formed by a curved surface that is recessed toward the shoulder-rib-side groove wall 61. More specifically, the second-rib-side curved surface portion 76 connects between the second second-rib-side groove wall 67 and the groove-bottom innermost portion 71. Because the groove-bottom innermost portion center 72 is situated closer to the second rib 45, the whole of the groove-bottom innermost portion 71 is situated closer to the second rib 45. Therefore, the groove-bottom innermost portion 71 and the shoulder-rib-side curved surface portion 75 are joined to each other near the central line 85.

The whole part of the shoulder-rib-side curved surface portion 75 in the tire width direction is formed so as to be situated not closer to the adjacent shoulder rib 41 than a joint portion 77 between the shoulder-rib-side curved surface portion 75 and the shoulder-rib-side groove wall 61. Likewise, the whole part of the second-rib-side curved surface portion 76 in the tire width direction is formed so as to be situated not closer to the adjacent second rib 45 than a joint portion 78 between the second-rib-side curved surface portion 76 and the second-rib-side groove wall 65. The joint portion 77 between the shoulder-rib-side curved surface portion 75 and the shoulder-rib-side groove wall 61 is preferably formed in such a position that a distance of the joint portion 77 from the tread surface 11 in the depth direction of the circumferential groove portion 50 is about one-half of the groove depth D of the circumferential groove portion 50.

The shoulder-rib-side curved surface portion 75 and the second-rib-side curved surface portion 76 are formed by curved lines each having a predetermined radius when viewed from the direction of FIG. 3 or when viewed as its cross-section in the meridian direction. Referring to each radius of the respective curved lines, the curved line of the shoulder-rib-side curved surface portion 75 has a larger radius than that of the curved line of the second-rib-side curved surface portion 76.

When a vehicle (not shown) with the pneumatic tire 1 is running, a load is applied to the tread surface 11 in contact with a road surface, the load is applied to the tread portion 10, and the load is also applied to the ribs 40 and the circumferential groove portions 50 that are formed on the tread portion 10. Particularly, a heavy load is easily applied to the shoulder rib 41 formed at the edge in the tire width direction due to a turn or the like of the vehicle. Therefore, stress is easily concentrated on the circumferential groove portion 50, out of the circumferential groove portions 50, which is adjacent to the shoulder rib 41 and is formed between the shoulder rib 41 and the second rib 45. However, in the circumferential groove portion 50 formed between the shoulder rib 41 and the second rib 45, the groove-bottom innermost portion center 72 is situated closer to the equatorial surface 90. More specifically, the groove-bottom innermost portion center 72 is situated closer to the equatorial surface 90 from the central line 85 of the groove width W and within the range from 5% to 30% of the groove width W. Furthermore, the shoulder-rib-side groove wall 61 and the groove bottom 70 are joined to each other by connecting between the groove-bottom innermost portion 71 having the groove-bottom innermost portion center 72 and the shoulder-rib-side groove wall 61 at the shoulder-rib-side curved surface portion 75.

Because of this, the groove bottom 70 and the shoulder-rib-side groove wall 61 are joined and formed with a smooth curved surface, which allows improved strength of a portion where the shoulder-rib-side groove wall 61 and the groove bottom 70 intersect each other. The shape when viewed as the cross-section from the meridian direction is formed in such a manner that the curved line of the shoulder-rib-side curved surface portion 75 has a greater radius than that of the curved line of the second-rib-side curved surface portion 76, which can more reliably improve the strength of a portion near the shoulder-rib-side curved surface portion 75. With these features, even if the heavy load is applied to the shoulder rib 41, the stress is suppressed from concentration on the portion where the shoulder-rib-side groove wall 61 and the groove bottom 70 intersect each other in the circumferential groove portion 50 adjacent to the shoulder rib 41. As a result, it is possible to suppress occurrence of a crack at this portion of the circumferential groove portion 50.

The angle α between the first second-rib-side groove wall 66 of the second-rib-side groove wall 65 and the virtual extension portion 80 is formed in the range of $45° \leq \alpha \leq 75°$, while the angle β between the shoulder-rib-side groove wall 61 and the virtual extension portion 80 is formed in the range of $75° \leq \beta \leq 110°$, and the angle α and the angle β are formed so that the relation therebetween is in the range of $0.5 \leq (\alpha/\beta) \leq 0.95$. By forming these angles in the above manner, the corner near the opening edge 46 of the second rib 45 tends to have an obtuse angle, which increases the rigidity of the second rib 45, and the corner near the opening edge 43 of the shoulder rib 41 tends to have an acute angle, which decreases the rigidity of the shoulder rib 41. Therefore, even if the load is applied to the shoulder rib 41, the shoulder rib 41 is deformed, which causes the stress due to the load to be dispersed, and the load is not so easily propagated to the circumferential groove portion 50 formed between the shoulder rib 41 and the second rib 45. Consequently, the stress concentration on the circumferential groove portion 50 is further suppressed. The suppression of the stress concentration on the circumferential groove portion 50 makes it possible to more reliably suppress occurrence of the crack in the circumferential groove portion 50.

By making smaller the angle α between the first second-rib-side groove wall 66 and the virtual extension portion 80 in the above manner, the groove width of the circumferential groove portion 50 can be made narrower along the direction of the groove bottom. With this feature, a curbstone or a pebble on the road surface is not so easily caught in the circumferential groove portion 50 during vehicle running. Therefore, it is possible to suppress the rib tear such that the stone or the like is caught in the circumferential groove portion 50 to cause the rib 40 to chip. By making larger the angle β between the shoulder-rib-side groove wall 61 and the virtual extension portion 80 in the above manner, it is possible to ensure the capacity of the circumferential groove portion 50 formed by the circumferential groove portion 50 and the virtual extension portion 80, to a capacity of predetermined size, and to ensure drainage. As a result of suppressing occurrence of the crack while suppressing the rib tear and ensuring drainage, it is possible to improve groove crack resistance while the drainage and the rib tear resistance are ensured.

The second-rib-side groove wall 65 is formed by the first second-rib-side groove wall 66 and the second second-rib-side groove wall 67 each of which is formed at a different angle. Consequently, it is possible to cause the groove-bottom innermost portion 71 to be situated closer to the equatorial surface 90 while the first second-rib-side groove wall 66 and the shoulder-rib-side groove wall 61 or the second-rib-side groove wall 65 and the shoulder-rib-side groove wall 61 are more surely formed at the angles. It is thereby possible to cause the groove-bottom innermost portion center 72 to be situated closer to the equatorial surface 90.

The corner portion 68 that is a joint portion between the first second-rib-side groove wall 66 and the second second-rib-side groove wall 67 is formed in the position such that the distance E from the tread surface 11 is one-half of the groove depth D. It is thereby possible to surely form the first second-rib-side groove wall 66 at the angle, ensure the predetermined groove width, and to situate the groove-bottom innermost portion center 72 closer to the equatorial surface 90. As a result of these studies, it is possible to improve the groove crack resistance while the drainage and the rib tear resistance to be more reliably ensured.

The angle β between the shoulder-rib-side groove wall 61 and the virtual extension portion 80 is formed in the range of $75° \leq \beta \leq 110°$, and the shoulder-rib-side curved surface portion 75 joined to the shoulder-rib-side groove wall 61 is formed so as to be situated not closer to the shoulder rib 41 than the joint portion 77. Moreover, the angle formed between the second second-rib-side groove wall 67 and the virtual extension portion 80 is 90° or less, and is made greater than the angle α between the second second-rib-side groove wall 67 and the virtual extension portion 80. Furthermore, the second-rib-side curved surface portion 76 joined to the second second-rib-side groove wall 67 is formed so as to be situated not closer to the direction of the second rib 45 than the joint portion 78. It is thereby possible to surely improve the strength of the portion where the shoulder-rib-side groove wall 61 and the groove-bottom innermost portion 71 intersect each other more than the strength of the portion where the second second-rib-side groove wall 67 and the groove-bottom innermost portion 71 intersect each other. This allows more reliable improvement of the groove crack resistance.

The joint portion 77 between the shoulder-rib-side curved surface portion 75 and the shoulder-rib-side groove wall 61 is formed in such a position that the distance from the tread surface 11 in the depth direction of the circumferential groove portion 50 is about one-half of the groove depth D of the circumferential groove portion 50, and the second second-rib-side groove wall 67 is formed at the angle. Consequently, the shoulder-rib-side curved surface portion 75 is still formed in the portion where the shoulder-rib-side groove wall 61 and the groove-bottom innermost portion 71 intersect each other even in a middle stage of wear of the tread portion 10, which makes it possible to ensure the strength of the portion where the shoulder-rib-side groove wall 61 and the groove-bottom innermost portion 71 intersect each other even in the progression of wear of the tread portion 10. Furthermore, by forming the second second-rib-side groove wall 67 at the angle, the capacity of the spatial portion of the circumferential groove portion 50 can be ensured, and the drainage can also be ensured. As a result of these studies, it is possible to improve the groove crack resistance while more reliably ensuring the drainage even in the progression of wear of the tread portion 10.

Figure 4:
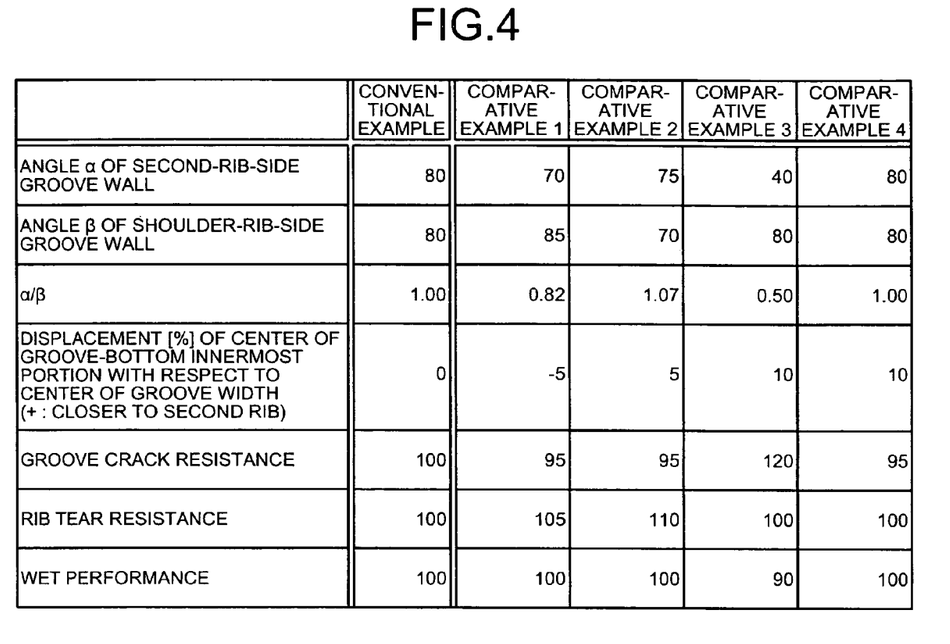
FIG. 4 is a diagram indicating results of performance evaluation tests on pneumatic tires.
Figure 5:
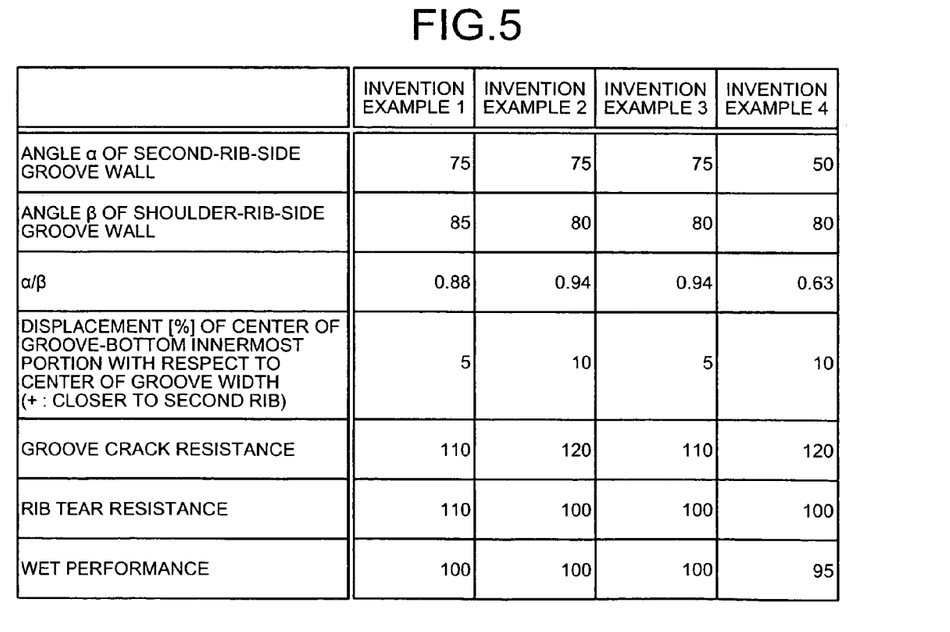
FIG. 5 is a diagram indicating results of performance evaluation tests on pneumatic tires.

Performance evaluation tests conducted on the conventional pneumatic tire and the pneumatic tire 1 according to the present invention are explained below. The performance evaluation tests were conducted on three items of the groove crack resistance, the rib tear resistance, and the wet performance. FIG. 4 and FIG. 5 are diagrams indicating the results of performance evaluation tests on the pneumatic tires.

A test method is such that the pneumatic tire 1 in the size 315/60 R 22.5 was mounted on a rim and the rim was mounted on a steer axis i.e. a front wheel of a 2D tractor, and the 2D tractor was driven 150,000 kilometers along a course of 100% paved road. As an evaluation method on test items, a test on the groove crack resistance was conducted by measuring the number, the length, and the depth of cracks formed in the circumferential groove portion 50 after it ran 150,000 kilometers. The results of measurements are indicated by indexes based on the groove crack resistance of the conventional pneumatic tire (explained later) that is set as 100. The larger the index is, the more excellent the groove crack resistance is. A test on the rib tear resistance was conducted by measuring the number and the size of chips occurring in the circumferential groove portion 50 interposed between the portion of the shoulder rib 41 on the second rib 45 side and the portion of the second rib 45 on the shoulder rib 41 side, namely between the shoulder rib 41 and the second rib 45. The results of measurements are indicated by indexes based on the rib tear resistance of the conventional pneumatic tire (explained later) that is set as 100. The larger the index is, the more excellent the rib tear resistance is. A test on the wet performance was conducted by measuring running stability when the 2D tractor was running along the wet road, based on sensory evaluation of a driver. The results of measurements are indicated by indexes based on the wet performance of the conventional pneumatic tire (explained later) that is set as 100. The larger the index is, the more excellent the wet performance is. In these evaluation tests, the index improved by 10% or more as compared with the index of the conventional example is decided as an effective one.

The pneumatic tire 1 to be tested includes four types according to the present invention, four types as comparative examples that are compared with the present invention, and one type as a conventional example, and these are tested in the above methods. In the conventional example, the angle α between the virtual extension portion 80 and the second-rib-side groove wall 65 is 80°, and the angle β between the virtual extension portion 80 and the shoulder-rib-side groove wall 61 is also 80°. Therefore, α/β is set as 1.00. In the position of the groove-bottom innermost portion center 72, a portion closer to the second rib 45 from the central line 85 of the groove width W is set as + (plus) and the displacement P from the central line 85 is expressed by a proportion (%) with respect to the groove width W. However, the groove-bottom innermost portion center 72 in the conventional example is situated on the central line 85 of the groove width W, and therefore, the displacement P becomes 0%.

Comparative example 1 as one of the comparative examples is such that the groove-bottom innermost portion center 72 is situated closer to the shoulder rib 41 than the central line 85 of the groove width W: the angle α is 70°, the angle β is 85°, α/β is 0.82, and the displacement P is −5%. In comparative example 2, the angle α is formed larger than the angle β: the angle α is 75°, the angle β is 70°, α/β is 1.07, and the displacement P is 5%. In comparative example 3, the angle α is formed at less than 45°, the angle α is 40°, the angle β is 80°, α/β is 0.50, and the displacement P is 10%. In comparative example 4, the angle α is formed at a larger angle than 75°, the angle α is 80°, the angle β is 80°, α/β is 1.00, and the displacement P is 10%.

On the other hand, in an example according to the present invention (hereinafter, "invention example") 1, the angle β is formed slightly larger: the angle α is 75°, the angle β is 85°, α/β is 0.88, and the displacement P is 5%. In invention example 2, the angle β is formed smaller than the angle β of the invention example 1, and the displacement P is formed larger than the displacement P of the invention example 1: the angle α is 75°, the angle β is 80°, α/β is 0.94, and the displacement P is 10%. In invention example 3, the displacement P is formed smaller than the displacement P of the invention example 2: the angle α is 75°, the angle β is 80°, α/β is 0.94, and the displacement P is 5%. In invention example 4, the angle α is smaller than the angle α of invention example 3, and the displacement P is formed in the same size as the displacement P of the invention example 2: the angle α is 50°, the angle β is 80°, α/β is 0.63, and the displacement P is 10%. The evaluation tests were conducted on the pneumatic tires 1 of the conventional example, the comparative examples 1 to 4, and the invention examples 1 to 4 using the methods above, and the results obtained through the tests are shown in FIG. 4 and FIG. 5. FIG. 4 represents the results of the evaluation tests of the conventional example and the comparative examples 1 to 4, and FIG. 5 represents the results of the evaluation tests of the invention examples 1 to 4.

As is clear from the test results as shown in FIG. 4 and FIG. 5, the angle α and the angle β of the circumferential groove portion 50 interposed between the second rib 45 and the shoulder rib 41, out of the circumferential groove portions 50, are formed so that the angle β is increased to greater than the angle α in a predetermined range. By doing so, the rib tear resistance and the wet performance can be ensured (invention examples 1 to 4). The groove-bottom innermost portion center 72 of the circumferential groove portion 50 is situated closer to the second rib 45. This allows formation of the shoulder-rib-side curved surface portion 75 with a larger diameter, and the groove crack resistance is improved (invention examples 1 to 4). Furthermore, the groove crack resistance is more effectively improved by enlarging the displacement P toward the second rib 45 of the groove-bottom innermost portion center 72 (invention examples 2, 4).

On the other hand, by positioning the groove-bottom innermost portion center 72 closer to the shoulder rib 41, the groove crack resistance decreases as compared with that of the conventional example (comparative example 1). Even when the groove-bottom innermost portion center 72 is situated closer to the second rib 45, the groove crack resistance decreases if the angle β is decreased because the rigidity of the shoulder rib 41 increases too high (comparative example 2), and the wet performance decreases if the angle α is decreased (comparative example 3), while the groove crack resistance decreases if the angle α is increased because the rigidity of the second rib 45 decreases (comparative example 4).

As a result of these tests, it is found that the groove crack resistance can be improved while the drainage and the rib tear resistance are ensured, based on the following conditions. The angle α is formed in a range of 45°≦α≦75°, the angle β is formed in a range of 75°≦β≦110°, a relation between the angle α and the angle β is 0.5≦(α/β)≦0.95, and the groove-bottom innermost portion center 72 is formed so as to be situated closer to the second rib 45 from the center of the groove width W in a range of 5% to 30% of the groove width W.

In the circumferential groove portion 50, all the portions in the circumferential direction are not necessarily formed in the above shapes, and therefore, at least the narrowest portion of the groove width in the tire circumferential direction may be formed in the above shape. The narrow groove width causes the crack to easily occur because the shoulder-rib-side groove wall 61 and the groove bottom 70 tend to be formed easily at a slightly acute angle and the stress is easily concentrated on this portion when the load is applied to the tread surface 11. Therefore, in at least the groove width of the circumferential groove portion 50, by situating the groove-bottom innermost portion center 72 at the narrowest portion closer to the second rib 45, it is possible to reduce stress concentration and suppress occurrence of the crack. Furthermore, by forming the portion of the circumferential groove portion 50 in the shape, it is possible to improve the groove crack resistance while ensuring the drainage and the rib tear resistance.

The circumferential groove portion 50 may not be formed linearly along the tire circumferential direction, and may be formed substantially along the tire circumferential direction. For example, the circumferential groove portion 50 may be formed in a slanting direction with respect to the tire circumferential direction that is a main direction, or may be formed in a meandering shape such as a zigzag shape or a wavy shape. If the circumferential groove portion 50 is formed in any shape, other than the linear shape, along the tire circumferential direction, the portion as follows may be formed in the cross-section according to the present invention. The portion is such that at least the shoulder-rib-side groove wall 61 is situated closest to the equatorial surface 90 in the tire width direction. The portion, where the shoulder-rib-side groove wall 61 is situated closest to the equatorial surface 90, is a portion where the width of the shoulder rib 41 in the tire width direction is the widest, and therefore, the rigidity of the shoulder rib 41 at this portion increases. Consequently, the crack easily occurs in the circumferential groove portion 50 adjacent to this portion of the shoulder rib 41 because the rigidity of the shoulder rib 41 is too high. Therefore, the groove-bottom innermost portion center 72 at the portion, where the shoulder-rib-side groove wall 61 is situated closest to the equatorial surface 90 in the tire width direction, is situated closer to the second rib 45, which causes stress concentration to be reduced and occurrence of the crack to be suppressed. This portion of the circumferential groove portion 50 is formed in the cross-section according to the present invention, which makes it possible to improve the groove crack resistance while ensuring the drainage and the rib tear resistance.

The shape of the cross-section as a meridian plane of the circumferential groove portion 50 may be formed in any shape other than the shape. The circumferential groove portion 50 may be formed in any shape if the shape can clear some conditions as follows. The conditions are such that the rigidity of the second rib 45 is increased while the rigidity of the shoulder rib 41 is decreased, the strength of the portion where the shoulder-rib-side groove wall 61 and the groove-bottom innermost portion 71 intersect each other is improved, and a narrow groove width can further be provided in any portion in the depth direction of the groove while the capacity of a space of the circumferential groove portion 50 can be ensured. By forming the circumferential groove portion 50 in the shape, it is possible to obtain the pneumatic tire 1 capable of improving the groove crack resistance while ensuring the drainage and the rib tear resistance.

In the embodiment, although the pneumatic tire having the rib pattern is used as an example of the pneumatic tire 1, the pneumatic tire 1 to which the present invention is applied may be any pneumatic tire having the tread portion 10 with any pattern other than the rib pattern, such as a rib-lug pattern and a block pattern. If the pneumatic tire 1 includes the tread surface 11 with the circumferential groove portion 50 formed therein, the pattern shape may be any shape.

Further effects and modifications can be easily made by persons skilled in the art. The modes of the present invention are not limited by the specific embodiments as explained above. Accordingly, various changes are possible without departing from the basic teaching or the scope of the present invention defined by the appended claims and equivalents thereto.

As is clear from the explanation, in the pneumatic tire 1 in which the circumferential groove portions 50 are formed on the tread surface 11, of the circumferential groove portions 50, it is focused on the circumferential groove portion 50 of which position in the tire width direction is closest to the shoulder portion 42 side. In this circumferential groove portion 50, the groove-bottom innermost portion center 72 at the narrowest portion of the groove width at least in the tire circumferential direction is situated closer to the equatorial surface 90 in the tire width direction than the center of the groove width. Furthermore, the angle between the virtual extension portion 80 of the tread surface 11 and the groove wall 60 on the equatorial surface 90 side is formed so as to be equal to or less than the angle between the virtual extension portion 80 of the tread surface 11 and the groove wall 60 on the shoulder portion 42 side. Thus, it is possible to improve the groove crack resistance while ensuring the drainage and the rib tear resistance.

More specifically, in the circumferential groove portion 50 situated closest to the shoulder portion 42 side, the groove-bottom innermost portion center 72, which is the center in the tire width direction of the groove-bottom innermost portion 71, is situated closer to the equatorial surface 90 in the tire width direction than the center of the groove width. Therefore, it is possible to improve the strength of the portion where the groove wall 60 on the shoulder portion 42 side and the groove bottom 70 intersect each other. Thus, it is possible to reduce concentration of the stress on the portion where the groove wall 60 on the shoulder portion 42 side and the groove bottom 70 of the circumferential groove portion 50 intersect each other even if the load is applied to the tread surface 11, and to suppress occurrence of the crack in this portion. Furthermore, by forming at least the narrowest part of the groove width of the circumferential groove portion 50 in the above-mentioned shape, it is possible to more effectively reduce stress concentration. More specifically, in the narrow part of the groove width, the angle of the portion, where the groove wall 60 on the shoulder portion 42 side and the groove bottom 70 intersect each other, tends to become easily acute and the stress is easily concentrated thereon, which causes the crack to easily occur. Therefore, by forming the shape of at least the narrowest part of the groove width of the circumferential groove portion 50 in the shape, it is possible to reduce stress concentration and suppress occurrence of the crack.

In the pneumatic tire 1, the angle between the virtual extension portion 80 of the tread surface 11 and the groove wall 60 on the equatorial surface 90 side is formed so as to be equal to or less than the angle between the virtual extension portion 80 of the tread surface 11 and the groove wall 60 on the shoulder portion 42 side. Therefore, if the pneumatic tire 1 according to the present invention is the rib tire, the rigidity of the rib 40 on the shoulder portion 42 side i.e. the rigidity of the shoulder rib 41 can be reduced, and the rigidity of the second rib 45 can be increased. Thus, it is possible to suppress occurrence of the crack in the circumferential groove portion 50 between the shoulder rib 41 and the second rib 45. Furthermore, by decreasing the angle between the virtual extension portion 80 of the tread surface 11 and the groove wall 60 on the equatorial surface 90 side, the groove width can be narrowed. It is thereby possible to suppress occurrence of the rib tear. Moreover, by increasing the angle between the virtual extension portion 80 of the tread surface 11 and the groove wall 60 on the shoulder portion 42 side, the capacity of the relevant circumferential groove portion 50 can be ensured. It is thereby possible to ensure drainage. As a result of these studies, it is possible to improve the groove crack resistance while ensuring the drainage and the rib tear resistance.

According to one aspect of the present invention, the pneumatic tire arrows improvement of the groove crack resistance while the drainage and the rib tear resistance are ensured.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pneumatic tire comprising a tread surface on which a plurality of circumferential groove portions is formed, wherein
a first groove portion between a second rib and a shoulder rib is situated closest to a shoulder portion side in a tire width direction among the circumferential groove portions, the first circumferential groove portion includes a first portion and a second portion in a tire circumferential direction, the first portion has a first width at the tread surface, the second portion has a second width at the tread surface, the first width is narrower than the second width,
a center of a groove-bottom innermost portion at the first portion is positioned closer to an equatorial surface in the tire width direction than a center of a tread surface groove width at the first portion,
the first portion includes an equatorial surface side groove wall and a shoulder portion side groove wall, and a first angle between a virtual extension portion of the tread surface and the equatorial surface side groove wall is equal to or less than a second angle between the virtual extension portion of the tread surface and the shoulder portion side groove wall, the equatorial surface side groove wall includes a first second-rib-side groove wall that is jointed with the tread surface to form the first angle with respect to the virtual extension portion, and a second second-rib-side groove wall that is jointed with the first second-rib-side groove wall to form a corner portion that projects toward the shoulder-portion-side groove wall and forms an angle greater than the first angle with respect to the virtual extension portion, a groove bottom includes a shoulder-rib-side curved surface portion that is projected toward the shoulder rib and jointed with the shoulder portion side groove wall, and a second-rib-side curved surface portion that is projected toward the second rib and jointed with the second second-rib-side groove wall, wherein the shoulder-rib-side curved surface portion has a larger radius of curvature than a radius of curvature of the second-rib-side curved surface portion, and the shoulder-rib-side curved surface portion and the second-rib-side curved surface portion are jointed at the groove-bottom innermost portion.

2. The pneumatic tire according to claim 1, wherein the center of the groove-bottom innermost portion is positioned closer to the equatorial surface by 5% or more of the tread surface groove width at the first portion than the center of the tread surface groove width at the first portion.

3. The pneumatic tire according to claim 1, wherein
the first angle is in a range of 45 degrees to 75 degrees,
the second angle is in a range of 75 degrees to 110 degrees, and
a ratio of the first angle to the second angle is in a range of 0.5 to 0.95.

4. A pneumatic tire comprising a tread surface on which a plurality of circumferential groove portions is formed, wherein a first groove portion is situated closest to a shoulder portion side in a tire width direction among the circumferential groove portions, the first circumferential groove portion includes a first portion and a second portion in a tire circumferential direction, the first portion has a first width at the tread surface, the second portion has a second width at the tread surface, the first width is narrower than the second width, and a center of a groove-bottom innermost portion at the first portion is positioned closer to an equatorial surface in the tire width direction than a center of a tread surface groove width at the first portion, the first portion includes an equatorial surface side groove wall and a shoulder portion side groove wall, and a first angle between a virtual extension portion of the tread surface and the equatorial surface side groove wall is equal to or less than a second angle between the virtual extension portion of the tread surface and the shoulder portion side groove wall, the groove-bottom innermost portion and the shoulder portion side groove wall are connected by a shoulder-portion-side curved surface that is a curved surface recessed to the equatorial surface side groove wall, and a joint portion of the shoulder portion side groove wall and the shoulder portion side curved surface is formed at a position where a distance of the joint portion from the tread surface in a depth direction of the circumferential groove portion is about a half of the groove depth of the circumferential groove portion, wherein the equatorial surface side groove wall is formed with a plurality of planes, and angles between each of the planes and the virtual extension portion of the tread surface in a depth direction of a groove are different.

5. The pneumatic tire according to claim 4, wherein
the equatorial surface side groove wall is formed with two planes,
angles between each of the two planes and the virtual extension portion of the tread surface in the depth direction of a groove are different, and
a joint portion of the two planes is formed at a position where a distance of the joint portion from the tread surface in the depth direction of the circumferential groove portion is a half of the groove depth of the circumferential groove portion.

6. The pneumatic tire according to claim 4, wherein
the groove-bottom innermost portion and the equatorial surface side groove wall are connected by an equatorial-surface-side curved surface that is a curved surface recessed to the shoulder portion side groove wall, and
in the shoulder-portion-side curved surface and the equatorial-surface-side curved surface when viewed as a cross-section in a meridian direction, a first radius of a curved line forming the shoulder-portion-side curved surface is larger than a second radius of a curved line forming the equatorial-surface-side curved surface.

7. A pneumatic tire comprising a tread surface on which a plurality of circumferential groove portions is formed, wherein a first groove portion between a second rib and a shoulder rib is situated closest to a shoulder portion side in a tire width direction among the circumferential groove portions, the first circumferential groove portion includes a first portion and a second portion in a tire circumferential direction, the first portion includes a first shoulder portion side groove wall on the shoulder portion side and a first equatorial surface side groove wall on equatorial surface side, the second portion includes a second shoulder portion side groove wall on the shoulder portion side and a second equatorial surface side groove wall on equatorial surface side, the first shoulder portion side groove wall is situated closer to the equatorial surface in the tire width direction than the second shoulder portion side groove wall, a center of a groove-bottom innermost portion at the first portion is positioned closer to the equatorial surface than a center of a tread surface groove width at the first portion, a first angle between a virtual extension portion of the tread surface and the first equatorial surface side groove wall is equal to or less than a second angle between the virtual extension portion of the tread surface and the first shoulder portion side groove wall, the first equatorial surface side groove wall includes a first second-rib-side groove wall that is jointed with the tread surface to form the first angle with respect to the virtual extension portion, and a second second-rib-side groove wall that is jointed with the first second-rib-side groove wall to form a corner portion that projects toward the shoulder portion side and forms an angle greater than the first angle with respect to the virtual extension portion, a groove bottom includes a shoulder-rib-side curved surface portion that is projected toward the shoulder rib and jointed with the first shoulder portion side groove wall, and a second-rib-side curved surface portion that is projected toward the second rib and jointed with the second second-rib-side groove wall, wherein the shoulder-ribside curved surface portion has a larger radius of curvature than a radius of curvature of the second-rib-side curved surface portion, and the shoulder-rib-side curved surface portion and the second-rib-side curved surface portion are jointed at the groove-bottom innermost portion.

8. The pneumatic tire according to claim 7, wherein the center of the groove-bottom innermost portion is positioned closer to the equatorial surface by 5% or more of the tread surface groove width at the first portion than the center of the tread surface groove width at the first portion.

9. The pneumatic tire according to claim 7, wherein
the first angle is in a range of 45 degrees to 75 degrees,
the second angle is in a range of 75 degrees to 110 degrees, and
a ratio of the first angle to the second angle is in a range of 0.5 to 0.95.

10. A pneumatic tire comprising a tread surface on which a plurality of circumferential groove portions is formed, wherein
a first groove portion is situated closest to a shoulder portion side in a tire width direction among the circumferential groove portions, the first circumferential groove portion includes a first portion and a second portion in a tire circumferential direction, the first portion includes a first shoulder portion side groove wall on the shoulder portion side and a first equatorial surface side groove wall on equatorial surface side, the second portion includes a second shoulder portion side groove wall on the shoulder portion side and a second equatorial surface side groove wall on equatorial surface side, the first shoulder portion side groove wall is situated closer to the equatorial surface in the tire width direction than the second shoulder portion side groove wall, and a center of a groove-bottom innermost portion at the first portion is positioned closer to the equatorial surface than a center of a tread surface groove width at the first portion,
a first angle between a virtual extension portion of the tread surface and the first equatorial surface side groove wall is equal to or less than a second angle between the virtual extension portion of the tread surface and the first shoulder portion side groove wall,
the groove-bottom innermost portion and the first shoulder portion side groove wall are connected by a shoulder-portion side groove curved surface that is a curved surface recessed to the first equatorial surface side groove wall, and
a joint portion of the first shoulder portion side groove wall and the shoulder-portion-side curved surface is formed at a position where a distance of the joint portion from the tread surface in the depth direction of the circumferential groove portion is about half of the groove depth of the circumferential groove portion, wherein
the first equatorial surface side groove wall is formed with a plurality of planes, and
angles between each of the planes and the virtual extension portion of the tread surface in a depth direction of a groove are different.

11. The pneumatic tire according to claim 10, wherein
the first equatorial surface side groove wall is formed with two planes,
angles between each of the two planes and the virtual extension portion of the tread surface in the depth direction of a groove are different, and
a joint portion of the two planes is formed at a position where a distance of the joint portion from the tread surface in the depth direction of the circumferential groove portion is a half of the groove depth of the circumferential groove portion.

12. The pneumatic tire according to claim 10, wherein
the groove-bottom innermost portion and the first equatorial surface side groove wall are connected by an equatorial-surface-side curved surface that is a curved surface recessed to the first shoulder portion side groove wall, and
in the shoulder-portion-side curved surface and the equatorial-surface-side curved surface when viewed as a cross-section in a meridian direction, a first radius of a curved line forming the shoulder-portion-side curved surface is larger than a second radius of a curved line forming the equatorial-surface-side curved surface.

13. A pneumatic tire comprising a tread surface on which a plurality of circumferential groove portions is formed, wherein
from among the circumferential groove portions, a circumferential groove portion between a second rib and a shoulder rib and situated closest to a shoulder portion side in a tire width direction has a center of a groove-bottom innermost portion, the center of the groove-bottom innermost portion at a portion where a groove width in at least a tire width direction is the narrowest, the center of the groove-bottom innermost portion being positioned closer to an equatorial surface in the tire width direction than a center of the groove width at the tread surface,
a first angle between a virtual extension portion of the tread surface and a groove wall on the equatorial surface side is equal to or less than a second angle between the virtual extension portion of the tread surface and a groove wall on the shoulder portion side,
the equatorial surface side groove wall includes a first second-rib-side groove wall that is jointed with the tread surface to form the first angle with respect to the virtual extension portion, and a second second-rib-side groove wall that is jointed with the first second-rib-side groove wall to form a corner portion that projects toward the shoulder portion side and forms an angle greater than the first angle with respect to the virtual extension portion,
a groove bottom includes a shoulder-rib-side curved surface portion that is projected toward the shoulder rib and jointed with a shoulder portion side groove wall, and a second-rib-side curved surface portion that is projected toward the second rib and jointed with the second second-rib-side groove wall, wherein the shoulder-rib-side curved surface portion has a larger radius of curvature than the second-rib-side curved surface portion, and
the shoulder-rib-side curved surface portion and the second-rib-side curved surface portion are jointed at the groove-bottom innermost portion.

* * * * *